(12) United States Patent
Wirth et al.

(10) Patent No.: US 8,092,749 B2
(45) Date of Patent: Jan. 10, 2012

(54) EXHAUST GAS TREATMENT DEVICE

(75) Inventors: Georg Wirth, Kirchheim/Teck (DE); Johannes Grupp, Donzdorf (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 420 days.

(21) Appl. No.: 11/528,019

(22) Filed: Sep. 27, 2006

(65) Prior Publication Data

US 2007/0071656 A1 Mar. 29, 2007

(30) Foreign Application Priority Data

Sep. 27, 2005 (DE) .......................... 10 2005 046 317

(51) Int. Cl.
*B01D 50/00* (2006.01)
(52) U.S. Cl. ..................................... 422/180
(58) Field of Classification Search ................. 422/177, 422/179, 180; 428/116
See application file for complete search history.

(56) References Cited

U.S. PATENT DOCUMENTS

| | | | |
|---|---|---|---|
| 4,419,108 A | 12/1983 | Frost et al. | |
| 5,980,837 A * | 11/1999 | Umin et al. | 422/179 |
| 6,338,826 B2 * | 1/2002 | Yamada et al. | 422/180 |
| 6,713,025 B1 * | 3/2004 | Ivanescu et al. | 422/177 |
| 2006/0165956 A1 * | 7/2006 | Souda | 428/116 |

FOREIGN PATENT DOCUMENTS

| | | | |
|---|---|---|---|
| JP | 4301130 | | 10/1992 |
| JP | 2002018290 A | * | 1/2002 |

OTHER PUBLICATIONS

European Search Report dated Dec. 11, 2006 for related EP Application No. EP 06 12 0630.

* cited by examiner

*Primary Examiner* — Tom Duong
(74) *Attorney, Agent, or Firm* — Howard IP Law Group, PC

(57) ABSTRACT

An exhaust gas treatment device for an exhaust system of an internal combustion engine, has a housing in which is arranged at least one ceramic body for exhaust gas treatment. To reduce the risk of damage for the ceramic body and/or the housing in the case of an inexpensive design, the ceramic body has a machined contact zone at least on its outlet end, and the housing has a bearing zone facing the ceramic body on its outlet end. The contact zone and the bearing zone cooperate with one another so that in the case of axial contact on the outlet end between the ceramic body and the housing, the ceramic body is in direct and axial contact with the housing in a line or over an area via the contact zone and the bearing zone, so that the contact is distributed in the circumferential direction or is continuous.

30 Claims, 9 Drawing Sheets

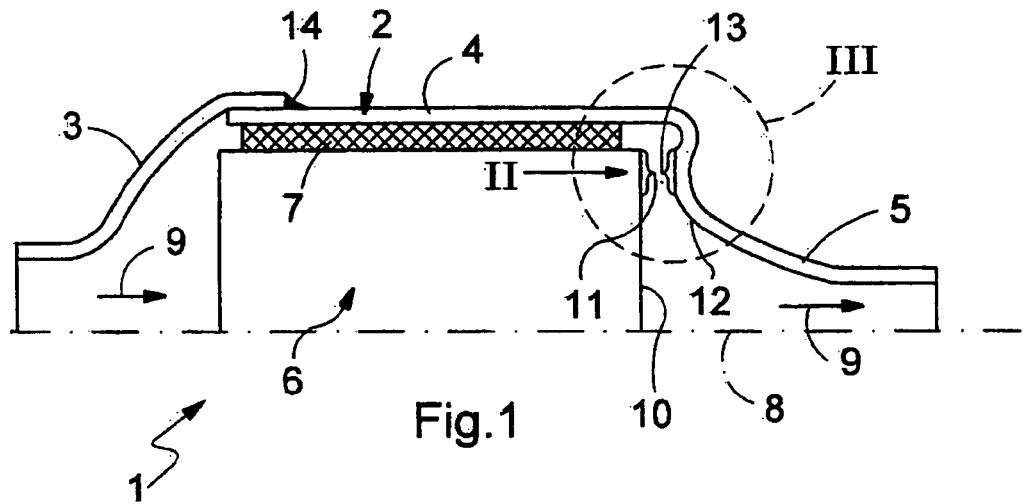
Fig.1
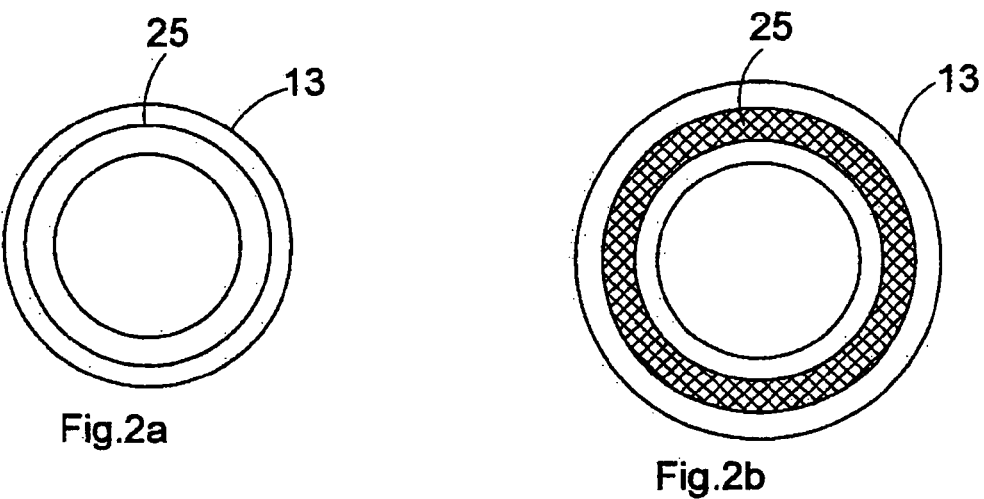
Fig.2a
Fig.2b
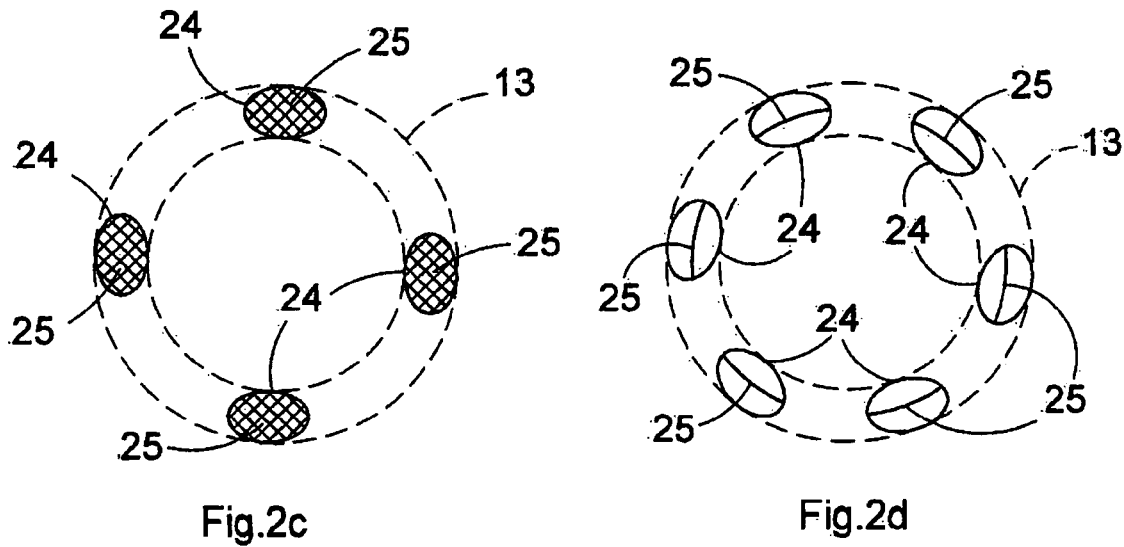
Fig.2c
Fig.2d

EXHAUST GAS TREATMENT DEVICE

This application claims foreign priority of German Patent Application No. DE 10 2005 046 317.7, filed Sep. 27, 2005 in Germany, which application is incorporated herein by reference in its entirety.

FIELD OF THE INVENTION

The present invention relates to an exhaust gas treatment device for an exhaust gas system of an internal combustion engine, in particular in a motor vehicle.

BACKGROUND OF THE INVENTION

An exhaust gas treatment device such as a particulate filter or a catalytic converter usually includes a housing in which is arranged at least one ceramic body for exhaust gas treatment. This ceramic body is designed as a particulate filter element or as a catalyst support, depending on the type of exhaust gas treatment device. Since the ceramic body has a flow resistance, it is exposed to axial forces in the direction of flow of the exhaust gas during operation of the internal combustion engine. In the case of a ceramic body designed as a particulate filter element in particular, these axial forces may increase considerably with an increase in the load on the particulate filter element.

Direct contact between the ceramic body and the housing, which is usually made of sheet metal, would result in destruction of the ceramic body and/or the housing. To prevent contact between the ceramic body and the housing in the axial direction, it is fundamentally possible to support the ceramic body on the housing on its outlet end with the help of supporting elements that act axially. These supporting elements may have or be formed by elastically flexible wire mesh cushions, for example. The supporting elements are designed in the form of a ring, for example, and are arranged as far as possible toward the outside radially to support the ceramic body axially on the housing. Assembly of such supporting elements is relatively cost-intensive.

SUMMARY OF THE INVENTION

The present invention is concerned with the problem of providing an improved embodiment for an exhaust gas treatment device of the type defined in the preamble which will have a comparatively inexpensive design in particular, whereby the risk of damage to the ceramic body and/or the housing due to axial contacting is reduced at the same time.

This invention is based on the general idea of equipping the ceramic body with a contact zone at the outlet end and equipping the housing with a bearing zone that is opposite the contact zone, whereby the contact zone and the bearing zone are coordinated with one another so that, for the case when there is axial contact between the ceramic body and the housing on the outlet end, direct and axial contact or bearing between the ceramic body and the housing develops such that it is continuous in the circumferential direction or is distributed over a line or an area. Such linear or area contact results in a uniform distribution of forces around the circumference between the ceramic body and the housing, which is associated with a significant reduction in force peaks. Despite the direct contact between the ceramic body and the housing, there is little or no damage to the ceramic body and/or the housing because of the uniformly distributed forces with reduced force peaks. The inventive exhaust gas treatment device does not require axial supporting elements on the outlet end between the ceramic body and the housing. This makes it possible to reduce the manufacturing cost.

In one embodiment, the bearing or contact is adapted so that it is distributed on the circumference, i.e., over multiple segment-like contacts arranged with a distance between them in the circumferential direction. However, a contact that is continuous in the circumferential direction, e.g., a circular or ring-shaped contact or touching is preferred.

This invention is also based on the finding that for most of the states that occur during use of the exhaust gas treatment device, it is sufficient to secure the position of the ceramic body in the housing, which can be achieved with the help of a bearing mat surrounding the ceramic body on the circumference. The ceramic body may become misaligned in the housing downstream when the securing function of the bearing mat is reduced accordingly due to aging phenomena only in rare cases in which the ceramic body has an extremely high flow resistance and the internal combustion engine generates a high exhaust mass flow and at the same time corresponding vibrations of the vehicle are accelerating the ceramic body in relation to the housing. These tend to be singular events in relation to the lifetime of the exhaust system and/or the internal combustion engine and/or the vehicle and occur very rarely or never at all. Accordingly, direct contact between the ceramic body and the housing owing to the reduced effective axial forces can be accepted.

The contact zone and the bearing zone are preferably arranged as far as possible on the outside radially so as to cause little or no significant impairment of the flow through the ceramic body in the contact case.

In a preferred embodiment, when the ceramic body is installed in the housing, the ceramic body is arranged in the housing such that the contact zone is an axial distance away from the bearing zone. This ensures that there will be no axial contact between the ceramic body and the housing as long as adequate holding forces are generated by the securing of the position, in particular with the help of a bearing mat.

It is self-evident that the features mentioned above and those to be explained in greater detail below may be used not only in the particular combination given but also in other combinations or alone without going beyond the scope of the present invention.

Preferred exemplary embodiments of the invention are illustrated in the drawings and explained in greater detail in the following description, where the same reference numerals in the figures refer to the same or similar or functionally identical components.

BRIEF DESCRIPTION OF THE DRAWINGS

The figures show, each in schematic diagrams:

FIG. 1 shows a simplified half-longitudinal section through an exhaust gas treatment device, FIGS. 2a to 2d show simplified axial views of a bearing zone according to an arrow II in FIG. 1.

DETAILED DESCRIPTION OF THE INVENTION

Figure 3:
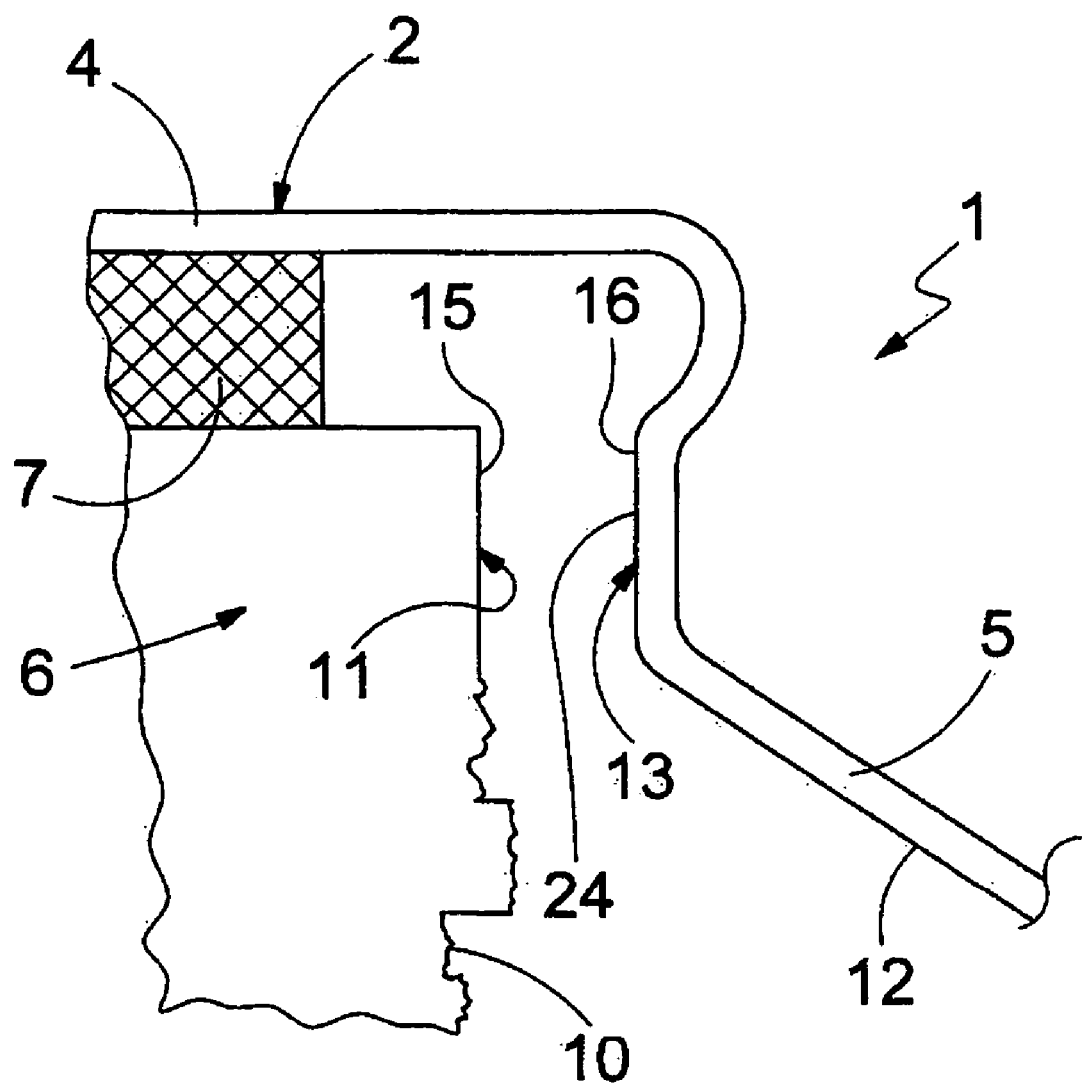
FIG. 3 shows an enlarged view of a detail III in FIG. 1, FIGS. 4 to 6 show views similar to those in FIG. 2 according to further embodiments of the present invention.

According to FIG. 1, an inventive exhaust gas treatment device 1 has a housing 2, which includes a receiving cone 3, an enclosure 4 and an outlet cone 5. The housing 2 and its components are usually made of a sheet metal, in particular steel plate or stainless steel plate. At least one ceramic body 6 which serves to treat the exhaust gas as provided in the housing 2. The exhaust gas treatment device 1 is provided for installation in an exhaust system of an internal combustion engine which is in turn preferably installed in a motor vehicle.

The ceramic body 6 is sheathed peripherally, i.e., on the outside radially, by a bearing mat 7, which serves to secure the position of the ceramic body 6 in the enclosure 4 of the housing 2. The bearing mat 7 is made of ceramic fibers, for example, and is usually prestressed radially by the installation. When the exhaust gas treatment device 1 is newly installed in a first position, this yields a sufficiently secured position for the ceramic body 6 in the radial and axial directions in the housing 2. The exhaust gas treatment device 1 and/or the housing 2 and the ceramic body 6 may have a rotationally symmetrical cross section with regard to a central longitudinal axis 8. Essentially, however, other cross sections are also possible, e.g., elliptical or oval cross sections.

Depending on the design of the exhaust gas treatment device 1, the ceramic body 6 may be a particulate filter element, for example, which is used in an exhaust system for a diesel engine or a gasoline engine for cleaning the exhaust gas. Likewise, ceramic body 6 may essentially also be a catalyst support, i.e., a ceramic substrate coated with a catalyst. The ceramic body 6 may be designed as a monolith, i.e., in one piece. It is likewise fundamentally possible to assemble the ceramic body from multiple monolithic bodies. In the case of a multipart ceramic body 6, the individual monolithic bodies may follow one another in the axial direction and may be attached to one another. It is likewise possible to assemble several monolithic bodies arranged parallel to one another with regard to the longitudinal direction to form the ceramic body 6. Because of its production as an extruded part, the ceramic body 6 preferably has a constant cross-sectional profile in the longitudinal direction. The arrows 9 indicate the direction of flow through the exhaust gas treatment device 1, i.e., the direction of flow of the exhaust gases flowing through the exhaust gas treatment device 1 during operation.

The ceramic body 1 is arranged downstream with respect to the direction of flow 9, at least on its outlet end 10, is equipped with a contact zone 11 which is characterized in that it is machined while the remaining outlet end 10 is essentially unmachined. The term "machining" as used in the present context is understood to refer to machining with removal of material, i.e., in particular machining by grinding or by milling. In addition, the housing 2 is also equipped with a bearing zone 13 facing the ceramic body 6 on its outlet end 12, i.e., downstream from the ceramic body 6. This bearing zone 13 and the aforementioned contact zone 11 are adapted to cooperate with one another, so that for the case when there is axial contact between the ceramic body 6 and the housing 2 on the outlet end, the ceramic body 6 may come into contact axially and directly with the housing 2 either in a line or over a surface area, distributed over the circumference or in a continuous form. The ceramic body 6 is then in axial contact with the housing 2 only in its contact zone 11 namely exclusively in its bearing zone 13.

FIGS. 2a through 2d show different exemplary embodiments of axial contact or touching between the ceramic body 6 and the housing 2, each shown in a simplified diagram, namely in an axial view according to the arrow 11 in FIG. 1.

FIGS. 2a through 2d each show only the bearing zone 13 which extends in the circumferential direction and is designed here as a circle and/or as a circular ring as an example. In the examples illustrated in FIGS. 2a and 2b, the bearing zone 13 is designed to be continuous in the circumferential direction. FIG. 2a shows an example of linear contact between the contact zone 11 and the bearing zone 13. This contact 25 is also continuous in the circumferential direction and is circular, for example. In the embodiment according to FIG. 2b, the contact 25 is designed over an area, namely covering the area in the circumferential direction, e.g., as a circular ring.

In the embodiment shown in FIGS. 2c and 2d, the contact zone 13 is formed by several separate bearing areas 24 arranged with a distance between them in the circumferential direction. In the event of contact, this does not yield any continuous contact in the circumferential direction but instead yields a touching or bearing 25 between the contact zone 11 and the bearing zone 13 that is distributed in the circumferential direction. FIG. 2c shows an example of area touching 25 distributed in the circumferential direction while FIG. 2d gives an example of linear touching 25 which is distributed in the circumferential direction. Such discrete contact areas 24 can be created comparatively easily on the housing 2 and/or on the outlet cone 5 and in the contact case they prevent complete sealing between the ceramic body 6 and the housing 2 in the area of the bearing zone 13.

According to FIG. 1, in the new state of the exhaust gas treatment device 1, the ceramic body 6 is positioned in the housing 2 in such a way that the contact zone 11 is at a distance in the axial direction from the bearing zone 13, particularly when new, the bearing mat 7 is able to position or secure the position of the ceramic body 6 in the housing 2 with sufficient holding force. Only during operation of the exhaust gas treatment device 1 do the high operating temperatures and the aging of the bearing mat 7, which may be associated with binder losses and fiber breakage, lead to a reduction in the assembly prestress so that the bearing mat 7 gradually loses its holding force for securing the position of the ceramic body 6 in the housing 2. When the bearing mat 7 is aged, there may be a corresponding acceleration of the ceramic body 6 in relation to the housing 2 in combination with a relatively great exhaust gas mass flow and a relatively high flow velocity of the ceramic body 6, which is established at a high loading of the ceramic body 6, which is designed as a particulate filter element, the axial holding force of the bearing mat may be overcome by the axial forces acting on the ceramic body 6 in the direction of flow, so that the ceramic body 6 is displaced downstream in the housing 2. In this case, the aforementioned axial contact may occur between the ceramic body 6 and the housing 2 resulting in the contact zone 11 coming into proximity of the bearing zone 13 until they are contiguous in a line or area that is continuous in the circumferential direction. A linear contact, like an area contact, leads to a uniform transfer force over the circumference between the ceramic body 6 and the housing 2 so that essentially there are no critical force peaks. The risk of damage to the ceramic body 6 and/or the housing 2 due to such contact is thus reduced.

The contact zone 11 is preferably designed to be continuous in the circumferential direction, i.e., designed in the form of a ring. Likewise, the bearing zone 13 may be designed in the form of a ring, e.g., continuous in the circumferential direction. Furthermore, with the embodiments illustrated here, the contact zone 11 inside the outlet end 10 may be designed only in an area or an edge area that is on the outside radially of the outlet end 10. Accordingly, the bearing zone 13 is preferably positioned exclusively in a radially outward area of the outlet end 12 of the housing 2, namely preferably on the outlet cone 5.

In the case of the housing 2, the two cones 3, 5 may be produced so that they are integral, i.e., made of one piece with the enclosure 4. Likewise, it is possible for at least one of the cones 3, 5 to be added on to the remaining housing 2, to be a separate component which is fixedly connected to the remaining housing 2 in a suitable manner, e.g., by means of a welded connection. For example, in FIG. 1 the receiving cone 3 is shown as a separate component, whereas the outlet cone 5 is integrated. In the variants according to FIGS. 3 and 5 through 9, the outlet cone 5 is also an integral component of the housing 2. In contrast with that, the outlet cone 5 in the embodiments according to FIGS. 4, 10 and 11 forms a separate component that is fixedly connected to the enclosure 4 by means of welded connections. The welded connections are labeled as 14 in the figures.

In the illustrated embodiments, in the axial section the, contact zone 11 has a profile 15 that is constant in the circumferential direction. Likewise, the bearing zone 13 is preferably equipped with a profile 16 that is constant in the circumferential direction. The bearing areas 24 also have such a bearing zone profile 16 which is constant in the circumferential direction. The following examples apply to bearing zones 13 that are continuous in the circumferential direction as well as bearing zones 13 composed of several bearing areas 24 distributed around the circumference.

In the embodiment shown in FIG. 3, the contact zone profile 15 and the bearing zone profile 16 are each designed as straight lines, whereby the two profiles 15, 16 extend parallel to one another and here in particular extend at a right angle to the longitudinal axis of the ceramic body 6. The contact zone 11 and the bearing zone 13 are thus each in planes that are parallel to one another. In the contact case, the contact zone 11 comes to bear against the surface of the bearing zone 13.

FIG. 3 shows clearly, and on an exaggerated scale, that the contact zone 11 differs from the other outlet end 10 of the ceramic body 6 in its machining. Although the outlet end 10 has marked irregularities and roughness in the unmachined state, these have been removed in the machined contact zone 11. It is possible here to machine the ceramic body 6 in the unfired state, known as the "green" state or in the fired or finished state.

An irregular outlet end 10 is obtained for the ceramic body 6 even when the latter is composed of multiple monolithic bodies running parallel to the longitudinal axis, these bodies not terminating such that they are flush with one another due to the assembly at the outlet end 10.

Figure 4:
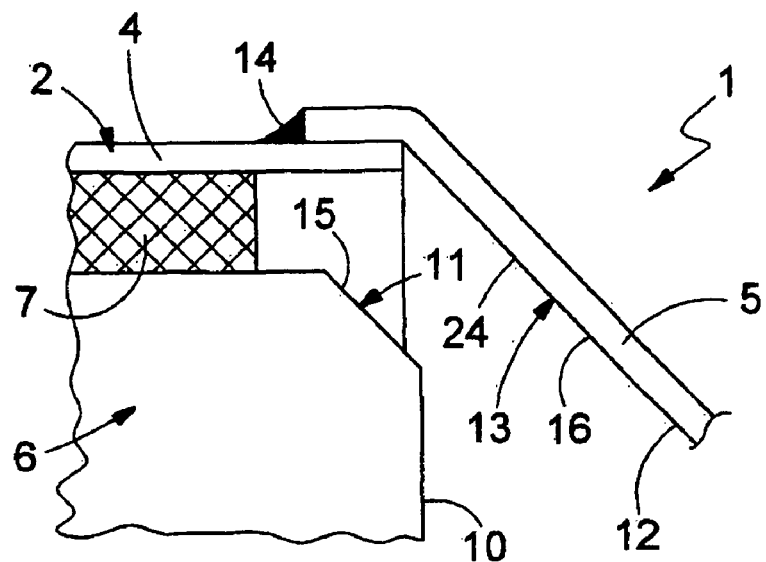

In the embodiment illustrated in FIG. 4, the two profiles 15, 16 also run parallel to one another but they are inclined with respect to a plane running perpendicular to the longitudinal direction of the ceramic body 6. Again in this embodiment, surface bearing of the two zones 11, 13 against one another can be implemented in the contact case. The contact zone 11 and the bearing zone 13 are situated here in the enclosure of an imaginary rotary body.

Figure 5:
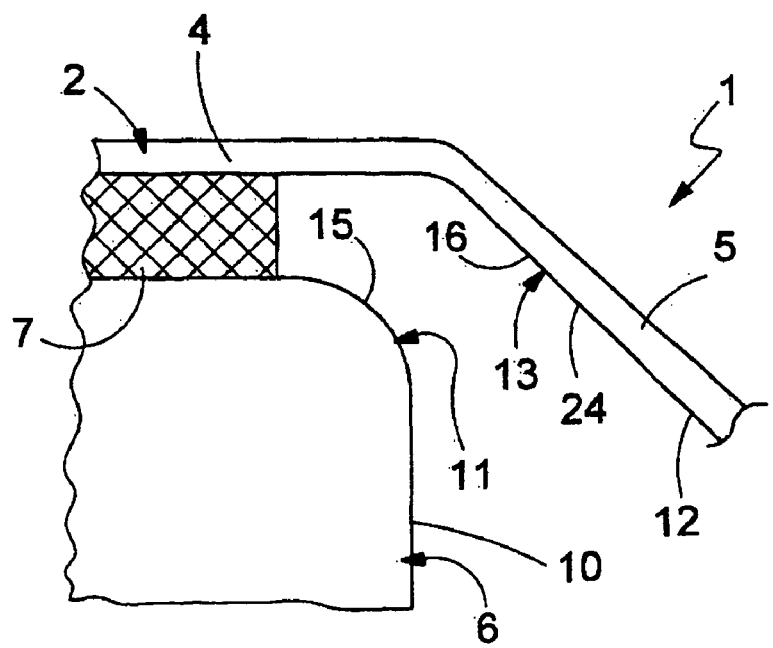

In the embodiment illustrated in FIG. 5, the contact zone 11 is provided with a profile 15 having a convex curvature. In contrast with that, the profile 16 of the bearing zone 13 again runs in a straight line extending at an inclination to a plane running perpendicular to the longitudinal axis of the ceramic body 6. In the contact case, this constellation leads to a linear bearing of the contact zone 11 on the bearing zone 13.

Figure 6:
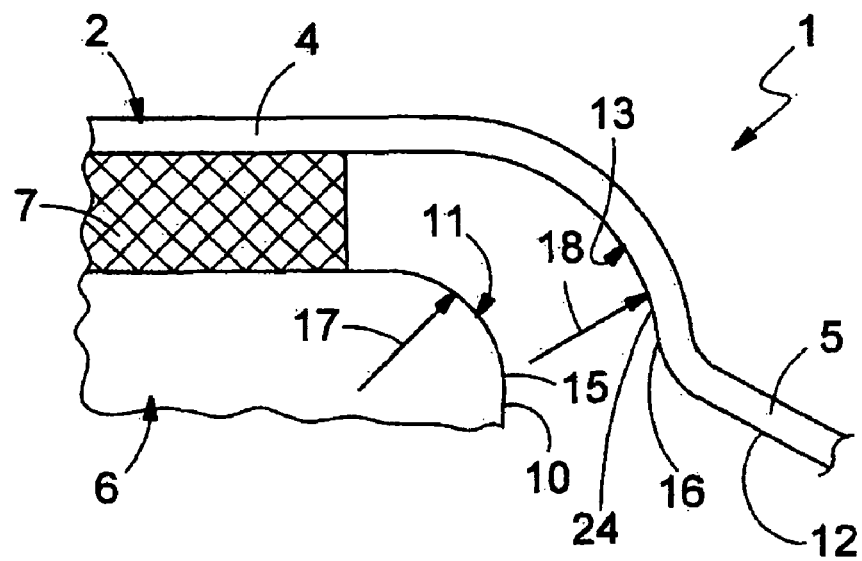

According to FIG. 6, in another embodiment the contact zone 11 may again have a contact zone profile 15 having a convex curvature. In this embodiment, the bearing zone profile 16 of the bearing zone 13 also has a concave curvature.

Essentially, the curved profiles 15 and/or 16 may have any curvature. However, embodiments in which the contact zone profile 15 and/or the bearing zone profile 16 has/have the curvature of an arc of a circle, i.e., each forms a circular arc segment are preferred. These circular arc segments are characterized by radius arrows in the respective figure.

As long as a radius 17 of the contact zone profile 15 is smaller than a radius 18 of the bearing zone profile 16 in the embodiment illustrated in FIG. 6, there is linear contact between the two zones 11, 13 in the contact case. If the two radii 17, 18 are identical in size, then the contact case leads to an area contact of the two zones 11 and 13 with one another. However, if the radius 17 of the contact zone profile 15 is larger than the radius 18 of the bearing zone profile 16, then one or even two linear contacts between the two zones 11, 13 can be achieved for the contact case. At least for the area contact in the contact case, it is important for the two profiles 15, 16 to be arranged concentrically with one another in the event of area contact.

Figure 7:
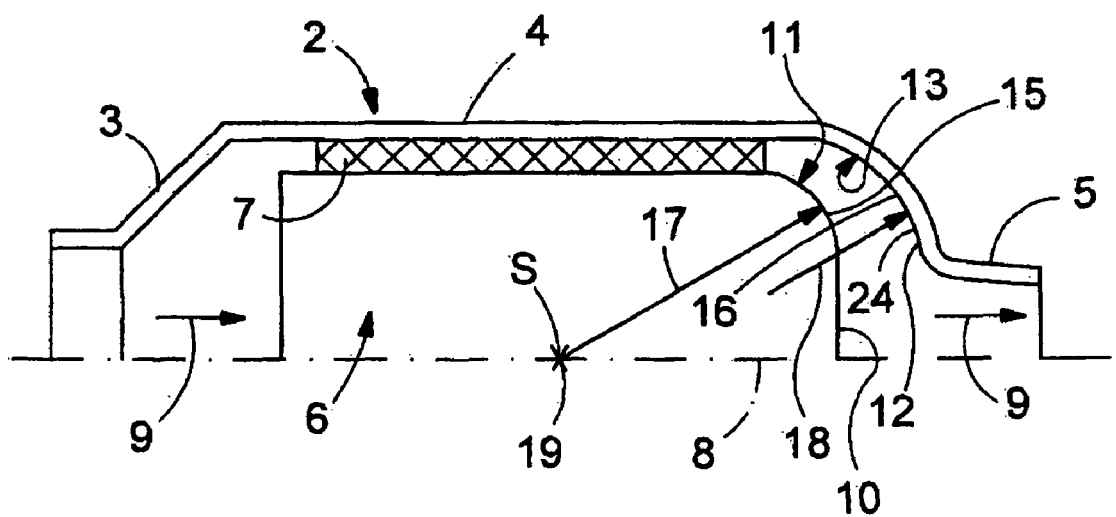
FIG. 7 shows a view similar to that of FIG. 1 according to another embodiment of the present invention.

FIG. 7 shows a preferred embodiment in which the radius 17 of the contact zone contour 15 has a midpoint 19 which is located on the central longitudinal axis 18 of the ceramic body 6. This midpoint 19 is preferably at the center of gravity S of the ceramic body 6, as is the case here.

Figure 8:
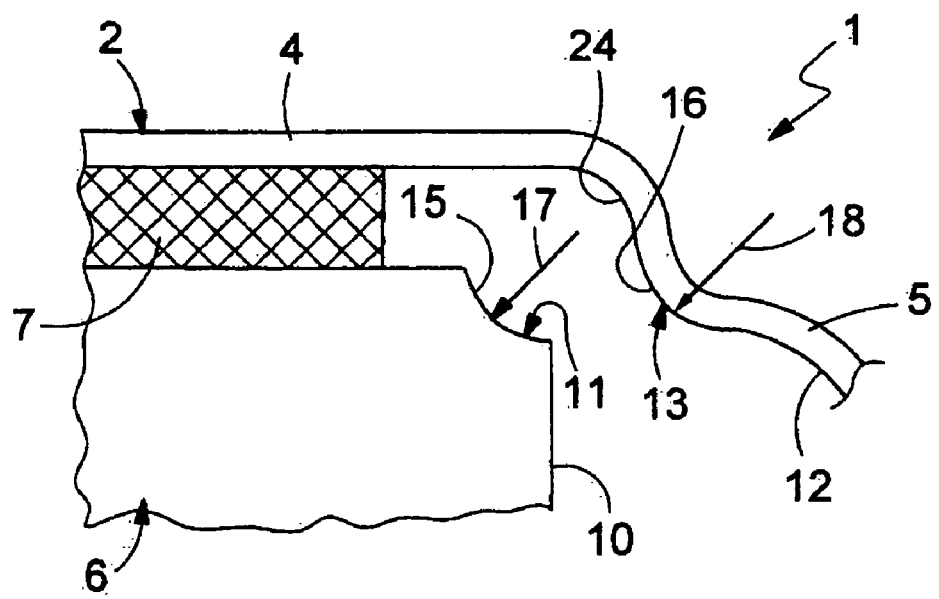
FIGS. 8 to 11 show views similar to FIG. 2 according to further embodiments.

In the embodiment illustrated in FIG. 8, the contact zone profile 15 of the contact zone 11 has a concave curvature, whereby it may form a circular arc segment with the radius 17, for example. Here again, the bearing zone 13 has an essentially complementary shape and has a bearing zone profile 16 having a convex curvature, namely in particular in the form of an arc of a circle with the radius 18. Through appropriate coordination of the two radii 17, 18, area contact or linear contact between the zones 11, 13 can be implemented for the contact case.

Figure 9:
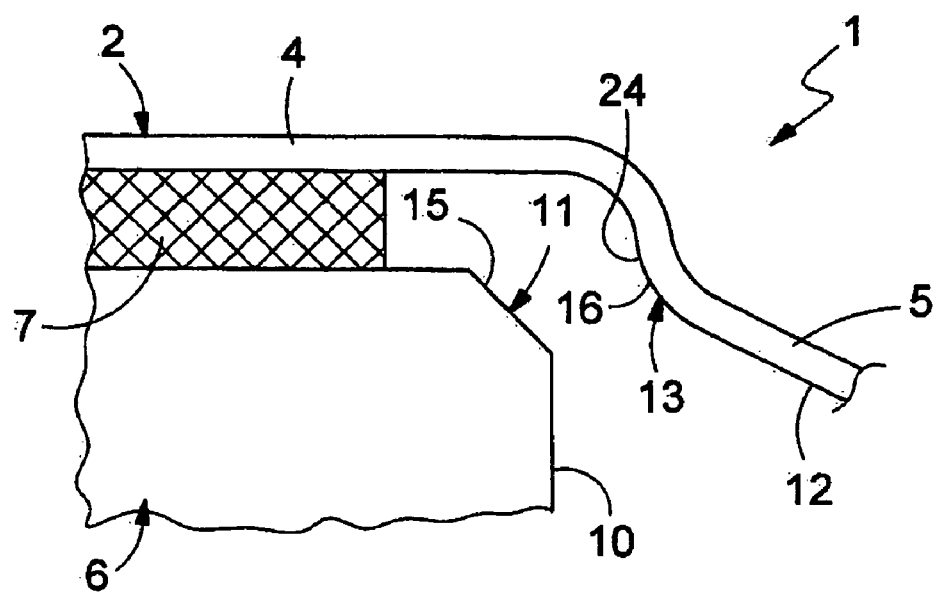

FIG. 9 shows an embodiment in which the contact zone 11 again has a straight-line contact zone profile 15 which is inclined with respect to a plane running perpendicular to the longitudinal axis of the ceramic body 6. In contrast with that, in this embodiment the bearing zone profile 16 has a convex curvature. In the contact case, this constellation leads to a linear contact between the two zones 11, 13.

Figure 10:
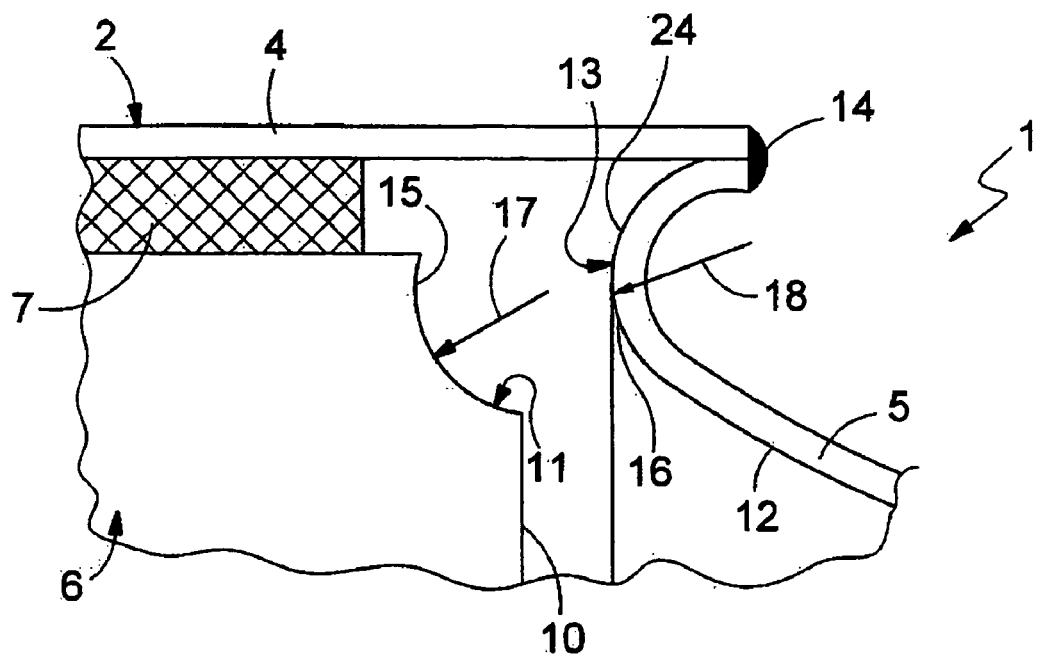

FIG. 10 shows an embodiment which corresponds to the embodiment illustrated in FIG. 7 with regard to the contouring of the contact zone 11 and the bearing zone 13. However, in the embodiment shown in FIG. 9, the outlet cone 5 is a separate component which is attached to the enclosure 4, e.g., by means of a weld 14. By coordinating the two radii 17, 18, linear or area contacts between the zones 11, 13 can also be achieved here for the contact case.

Figure 11:
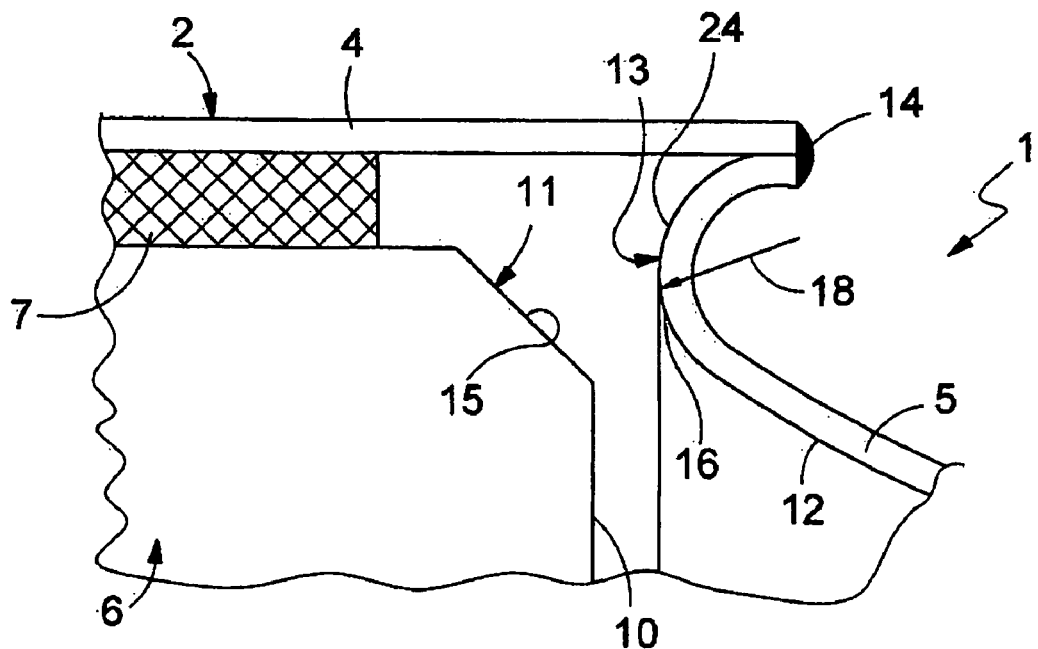

The embodiment illustrated in FIG. 11 corresponds to the embodiment illustrated in FIG. 9 with regard to the design of the zones 11, 13, which allows a linear contact. However, in the embodiment illustrated in FIG. 11, the outlet cone 5 is designed as a separate component which is attached in a suitable way to the enclosure 4 of the housing 2, e.g., via a weld 14.

According to FIGS. 12 through 14, the ceramic body 6 may have a plurality of channels parallel to one another and to the longitudinal direction of the ceramic body 6 when the latter is designed as a particulate filter element. Then the outlet channels 20, which are sealed at the inlet end and are open at the outlet end, are differentiated from inlet channels 21, which are open at the inlet end and are sealed at the outlet end. Neighboring channels 20, 21 are separated from one another by walls that are shared but are gas-permeable. Accordingly, this yields the flow through the ceramic body 6 as indicated by the arrows in the figures. The inlet channels 21 are sealed at the outlet end with stoppers 22 that are attached subsequently. Initially all the channels 20, 21 are open at both ends in the production phase of the ceramic body 6.

Figure 12A:
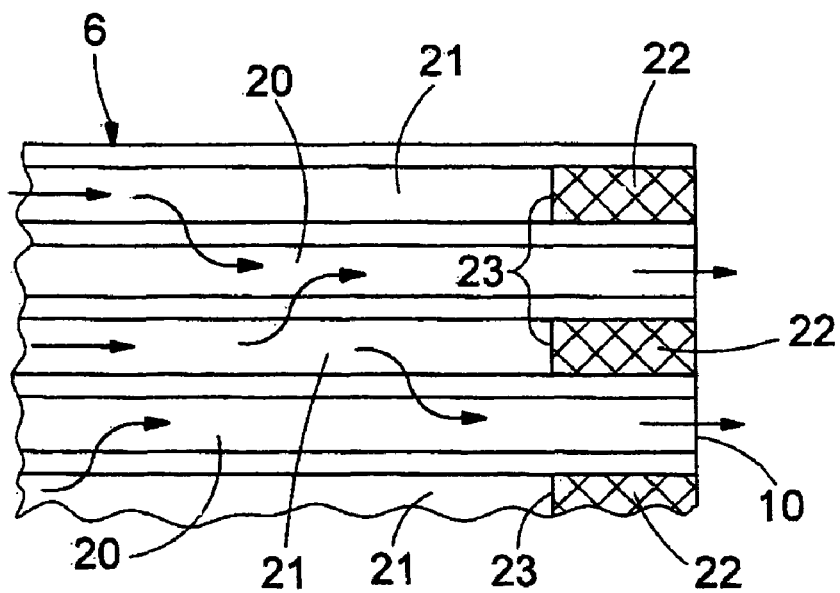
FIGS. 12 to 14 show simplified enlarged longitudinal sections through a ceramic body in the area of a contact zone a) before machining the ceramic body and b) after machining the ceramic body.

FIG. 12a shows the ceramic body 6 before production of the phase-like contact zone 11. In contrast with that, in the diagram according to FIG. 12b, the contact zone 11 is implemented, e.g., by grinding or lathing the exterior edge area of the outlet end 10. It can be seen here that inlet channels 21 may also lie within the contact zone 15. In the production of the contact zone 11, it is important to be sure that the stoppers 22 of the inlet channels 21 which lie in the contact zone 11 do not become leaky and in particular are not removed completely. Inlet channels 21 that are open at the outlet end due to the machining of the outlet end 10 would lead to faulty flow of unfiltered exhaust gases.

Fundamentally, the ceramic body 6 can be manufactured in a targeted manner so that exclusively outlet channels 20 or exclusively inlet channels 21 are situated in the radially outer edge area provided for the contact zone 11.

Figure 12B:
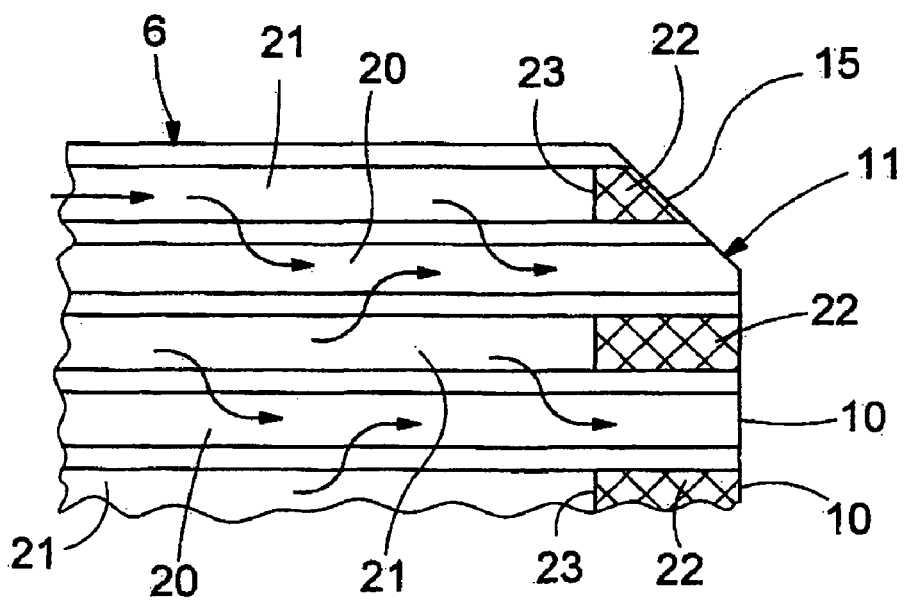

In the embodiment illustrated in FIG. 12b, the stoppers 22 are designed and arranged identically in the inlet channels 21, regardless of whether the respective inlet channel 21 is situated inside or outside of the contact zone 11. The axial length of the stoppers 22 is limited. This results in structural restrictions for the design of the contact zone 11 because the closures of the inlet channels 21 on the outlet end must not become leaky during their production.

Figure 13A:
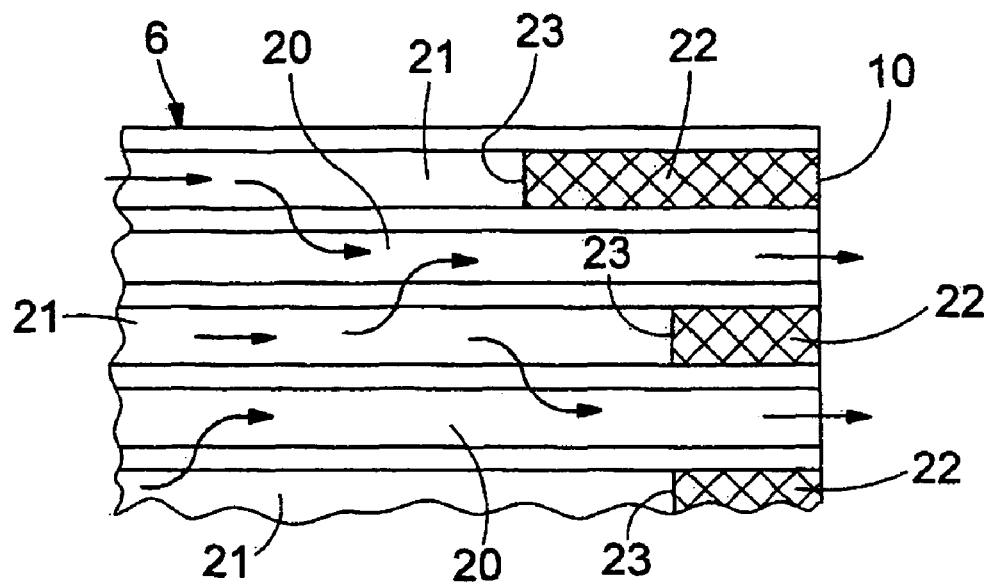
Figure 13B:
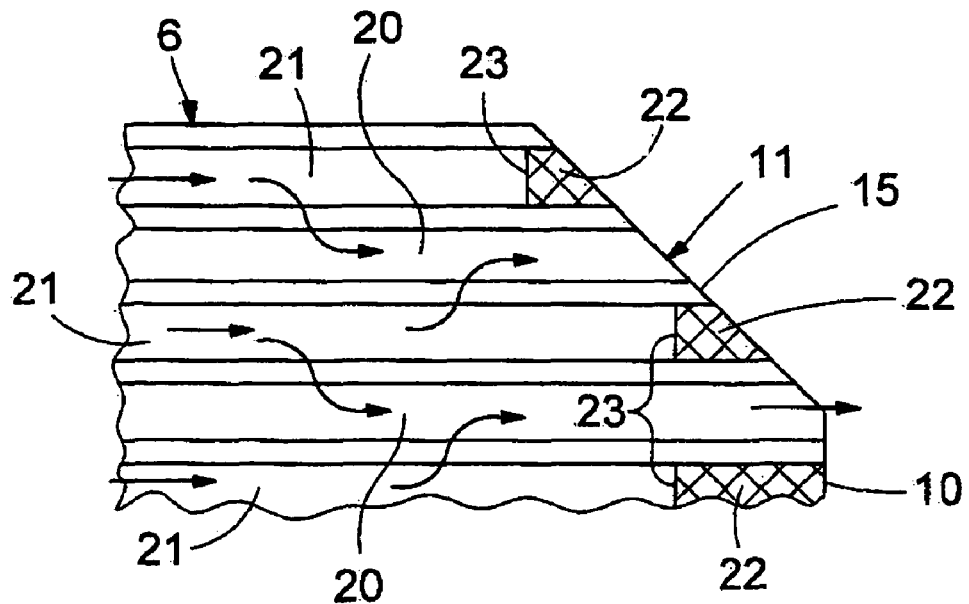
Figure 14A:
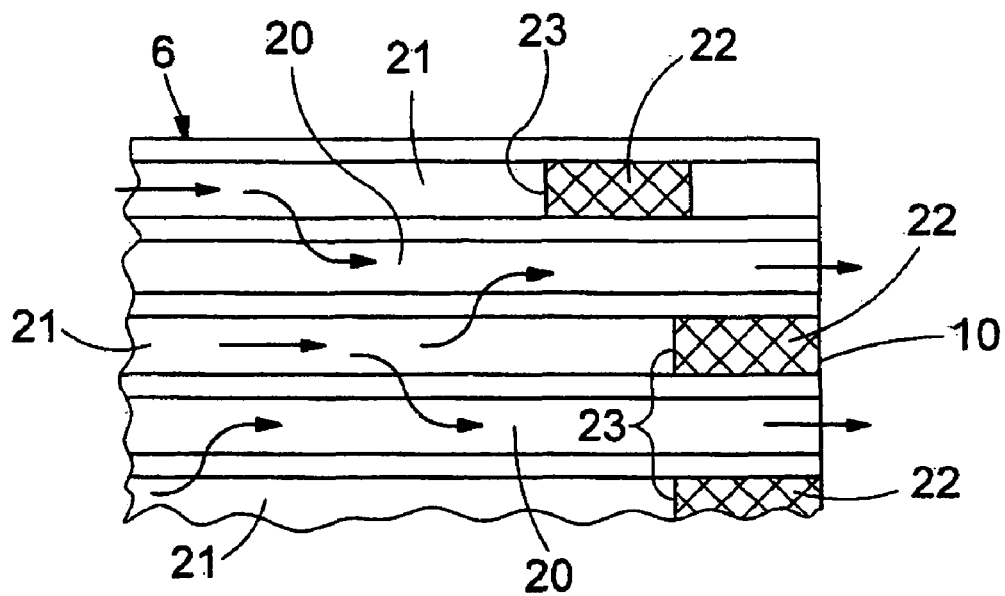
Figure 14B:
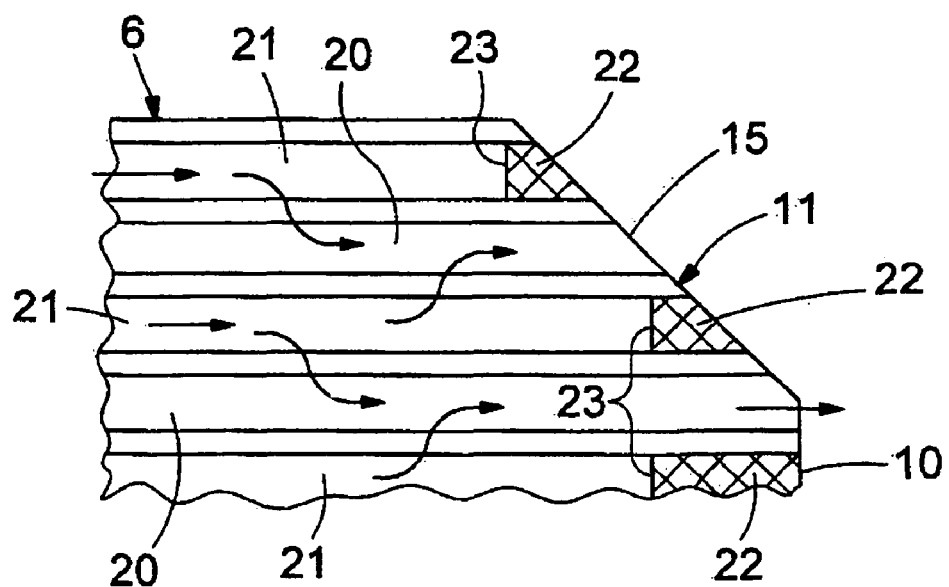

To improve the design freedom of the contact zone 11, it is possible according to FIGS. 13 and 14 for the stoppers 22 for sealing the outlet ends of the inlet channels 21 which are inside the contact zone 11 to be designed and/or arranged in at least some of these inlet channels 21, so that their inner ends 23 are arranged farther toward the interior axially than the inner ends 23 of the stoppers that serve to seal the outlet end of the other inlet channels 21 situated outside of the contact zone 11. This constellation can be seen in FIGS. 13b and 14b. This constellation is achieved for example by the fact that in the unmachined state, the stoppers which should have the ends 23 situated farther toward the inside have a greater axial length according to FIG. 13a, for example, in the unmachined state than the other stoppers 22 which are assigned to the inlet channels 21 situated outside of the contact zone 11. It is likewise possible according to FIG. 14a to design the stoppers 22 that are provided with ends 23 situated farther toward the interior so that, after the production of the contact zone 11, they are of the same size in the axial direction as the other stoppers 22. However, these stoppers 22 are inserted farther in the axial direction into the respective inlet channels 21 than the other stoppers 22 when the inlet channels 21 are sealed at the outlet end.

Essentially, the ceramic body may be made of a traditional ceramic material such as an oxide ceramic, in particular cordierite. However, an embodiment in which the ceramic body 6 is made of silicon carbide is preferred. This material is characterized by a relatively high hardness and stability, thereby additionally reducing the risk of damage to the ceramic body 6 in the event of direct contact between the contact zone 11 and the bearing zone 13.

According to FIG. 1, the ceramic body 6 in the new state of the exhaust gas treatment device 1 illustrated here is arranged in the housing 2 so that it is free-standing axially at its outlet end 10. In other words, in the new state, there is no contact at the outlet end between the ceramic body 6 and the housing 2 or any other component of the housing 2.

What is claimed is:

1. An exhaust gas treatment device for an exhaust system of an internal combustion engine, said device comprising:
   a housing;
   at least one ceramic body for exhaust treatment positioned in a first position in said housing;
   wherein said ceramic body has a machined contact zone on its outlet end, and said housing having a bearing zone facing said outlet end of said ceramic body, wherein in said first position of said ceramic body, said machined contact zone is separated from said bearing zone by a given distance in an axial direction;
   wherein said machined contact zone of said ceramic body and said bearing zone of said housing are adapted to cooperate with one another so that in the case of an axial contact between said ceramic body and said housing, said ceramic body is in direct axial contact with said housing over said machined contact zone and said bearing zone, in case said ceramic body moves away from its said first position toward said housing,
   wherein said contact zone of said ceramic body has a profile in the axial section and said bearing zone of said housing has a bearing zone profile,
   wherein said bearing zone profile has a concave curvature, and
   wherein said profile of said contact zone has a convex curvature.

2. The exhaust gas treatment device of claim 1, wherein said machined contact zone of said ceramic body is disposed on a radially outward area on said outlet end of said ceramic body.

3. The exhaust gas treatment device of claim 1, wherein said contact zone of said ceramic body is continuous in the circumferential direction.

4. The exhaust gas treatment device of claim 1, wherein said bearing zone of said housing is disposed on a radially outward area on said outlet end of said housing.

5. The exhaust gas treatment device of claim 1, wherein said profile of said contact zone is continuous in the circumferential direction.

6. The exhaust gas treatment device of claim 1, wherein said profile of said bearing zone is continuous in the circumferential direction.

7. The exhaust gas treatment device of claim 1, wherein said concave curvature of said profile of said bearing zone is in the form of an arc of a circle.

8. The exhaust gas treatment device of claim 7, wherein said profile of the contact zone and said profile of said bearing zone are arranged concentrically with each other.

9. The exhaust gas treatment device of claim 1, wherein said ceramic body comprises a particulate filter element comprising:
   a plurality of outlet channels sealed with a plurality of stoppers at the inlet ends of said outlet channels; and
   a plurality of inlet channels sealed with a plurality of stoppers at the outlet ends of said inlet channels.

10. The exhaust gas treatment device of claim 9, wherein said inlet channels sealed at their outlet ends are situated inside said contact zone of said ceramic body.

11. The exhaust gas treatment device of claim 9, wherein either said outlet channels only are situated in said contact zone of said ceramic body or said inlet channels only are situated in said contact zone of said ceramic body.

12. The exhaust gas treatment device of claim 9, wherein some or all of said stoppers for sealing said inlet channels on the outlet ends of said inlet channels are disposed within said contact zone of said ceramic body such that the inner ends of said stoppers are arranged farther toward the interior axially than the inner ends of said stoppers for sealing the outlet end of said inlet channels situated outside of said contact zone of said ceramic body.

13. The exhaust gas treatment device of claim 1, wherein said ceramic body comprises a monolith or said ceramic body comprises a plurality of monolithic bodies.

14. The exhaust gas treatment device of claim 1, wherein said ceramic body has a constant cross-sectional profile in its longitudinal direction.

15. The exhaust gas treatment device of claim 1, wherein said ceramic body is made of silicon carbide.

16. The exhaust gas treatment device of claim 1, wherein said ceramic body comprises a particulate filter element or as a catalyst support.

17. The exhaust gas treatment device of claim 1, further comprising a bearing mat surrounding said ceramic body on the circumference of said ceramic body for securing said ceramic body in said first position in said housing.

18. The exhaust gas treatment device of claim 1, wherein said ceramic body, when newly installed in said first position is arranged in said housing so that it is axially free-standing on the outlet end of said ceramic body.

19. The exhaust gas treatment device of claim 1, wherein said housing further comprises an outlet cone on which said bearing zone is designed.

20. The exhaust gas treatment device of claim 19, wherein said outlet cone is attached to the housing or is manufactured in one piece together with said housing.

21. The exhaust gas treatment device of claim 1, wherein said profile of the contact zone and said profile of the bearing zone are adapted to establish a linear contact between the contact zone and the bearing zone.

22. The exhaust gas treatment device of claim 1, wherein said profile of the contact zone and said profile of the bearing zone are adapted to establish an area contact between the contact zone and the bearing zone.

23. An exhaust gas treatment device for an exhaust system of an internal combustion engine, said device comprising:
a housing;
at least one ceramic body for exhaust treatment positioned in a first position in said housing;
wherein said ceramic body has a machined contact zone on its outlet end and said housing has a bearing zone facing said outlet end of said ceramic body, wherein in said first position of said ceramic body, said machined contact zone is separated from said bearing zone by a given distance in an axial direction;
wherein said machined contact zone of said ceramic body and said bearing zone of said housing are adapted to cooperate with one another so that in the case of an axial contact between said ceramic body and said housing, said ceramic body is in direct axial contact with said housing over said machined contact zone and said bearing zone, in case said ceramic body moves away from its said first position toward said housing,
wherein said contact zone of said ceramic body has a profile in the axial section,
wherein said profile of said contact zone has a curvature in the form of an arc of a circle, said circle having a radius, the midpoint of said radius lying on the longitudinal central axis of said ceramic body.

24. An exhaust gas treatment device for an exhaust system of an internal combustion engine, said device comprising:
a housing;
at least one ceramic body for exhaust treatment positioned in a first position in said housing;
wherein said ceramic body has a machined contact zone on its outlet end and said housing has a bearing zone facing said outlet end of said ceramic body, wherein in said first position of said ceramic body, said machined contact zone is separated from said bearing zone by a given distance in an axial direction;
wherein said machined contact zone of said ceramic body and said bearing zone of said housing are adapted to cooperate with one another so that in the case of an axial contact between said ceramic body and said housing, said ceramic body is in direct axial contact with said housing over said machined contact zone and said bearing zone, in case said ceramic body moves away from its said first position toward said housing,
wherein said contact zone of said ceramic body has a profile in the axial section and said bearing zone of said housing has a bearing zone profile,
wherein said profile of said contact zone has a concave curvature, and
wherein said profile of said bearing zone has a convex curvature.

25. The exhaust gas treatment device of claim 24, wherein said profile of the contact zone and said profile of the bearing zone are adapted to establish a linear contact between the contact zone and the bearing zone.

26. The exhaust gas treatment device of claim 24, wherein said profile of the contact zone and said profile of the bearing zone are adapted to establish an area contact between the contact zone and the bearing zone.

27. An exhaust gas treatment device for an exhaust system of an internal combustion engine, said device comprising:
a housing;
at least one ceramic body for exhaust treatment positioned in a first position in said housing;
wherein said ceramic body has a machined contact zone on its outlet end and said housing has a bearing zone facing said outlet end of said ceramic body, wherein in said first position of said ceramic body, said machined contact zone is separated from said bearing zone by a given distance in an axial direction;
wherein said machined contact zone of said ceramic body and said bearing zone of said housing are adapted to cooperate with one another so that in the case of an axial contact between said ceramic body and said housing, said ceramic body is in direct axial contact with said housing over said machined contact zone and said bearing zone, in case said ceramic body moves away from its said first position toward said housing, and
wherein said bearing zone of said housing is formed by a plurality of separate bearing areas that are distributed along the circumferential direction and are spaced a distance apart from one another in the circumferential direction.

28. An exhaust gas treatment device for an exhaust system of an internal combustion engine, said device comprising:
a housing;
at least one ceramic body for exhaust treatment positioned in a first position in said housing;
wherein said ceramic body has a machined contact zone on its outlet end and said housing has a bearing zone facing said outlet end of said ceramic body, wherein in said first position of said ceramic body, said machined contact zone is separated from said bearing zone by a given distance in an axial direction;
wherein said machined contact zone of said ceramic body and said bearing zone of said housing are adapted to cooperate with one another so that in the case of an axial contact between said ceramic body and said housing, said ceramic body is in direct axial contact with said housing over said machined contact zone and said bearing zone, in case said ceramic body moves away from its said first position toward said housing, wherein said contact zone of said ceramic body has a profile in the axial section, wherein said profile of said contact zone has a curvature in the form of an arc of a circle, said circle having a radius, the midpoint of said radius lying at the center of gravity of said ceramic body.

29. An exhaust gas treatment device for an exhaust system of an internal combustion engine, said device comprising:
   a housing;
   at least one ceramic body for exhaust treatment positioned in the housing;

wherein said ceramic body has a machined contact zone on its outlet end;

wherein said housing has a bearing zone facing said outlet end of said ceramic body;

wherein said machined contact zone of said ceramic body is disposed on a radially outward area on said outlet end of said ceramic body and has a profile in the axial section;

wherein said bearing zone of said housing is disposed on a radially outward area on said outlet end of said housing and has a profile in the axial section;

wherein the contact zone profile and the bearing zone profile run parallel to each other and parallel to a plane running perpendicular to the longitudinal axis of said ceramic body;

wherein said contact zone of said exhaust gas treatment device is at a distance axially from said bearing zone of said housing, when said device is newly installed in a first position in said housing, and wherein said machined contact zone of said ceramic body and said bearing zone of said housing are adapted to cooperate with one another so that in the case of an axial contact between said ceramic body and said housing, said ceramic body is directly and axially in contact with said housing over said machined contact zone and said bearing zone.

30. The exhaust gas treatment device of claim 29, wherein said bearing zone comprises a plurality of bearing areas on said bearing zone of said housing situated in a common plane.

* * * * *